May 17, 1960  W. WILSON  2,936,801

PLANING SAW BLADE

Filed March 14, 1957

Inventor

W. Wilson

By Clarent Downing Seibold

Attorneys

ID
2,936,801
PLANING SAW BLADE

William Wilson, Mount Eden, Auckland, New Zealand

Application March 14, 1957, Serial No. 646,121

Claims priority, application Great Britain July 27, 1956

1 Claim. (Cl. 143—140)

This invention relates to saw teeth, saws and methods of cutting materials, and has been devised particularly, though not solely, for use in cutting wood.

It is an object of the present invention in one aspect to provide a saw tooth and/or a saw which in use will enable both a sawing and a planing action to be performed substantially simultaneously on suitable material, e.g. a board or other timber.

In a further aspect it is an object of the invention to provide methods of simultaneously cutting and planing materials and materials made by such methods.

Accordingly in one aspect the invention consists in a saw tooth having a cutting edge which in use planes a side of a saw cut made substantially simultaneously by the tooth.

In a further aspect the invention consists in a saw provided with planing means to plane or smooth at least one side of a saw cut substantially simultaneously with the cutting of said saw cut.

In a still further aspect the invention consists in a saw provided with teeth so constructed and arranged that in use said teeth perform the dual function of making a saw cut and substantially simultaneously planing thereof or smoothing one or each side of said saw cut.

In a still further aspect the invention consists in a method of simultaneously cutting and planing material comprising the steps of making a saw cut in said material and substantially simultaneously smoothing or planing the sides of the saw cut.

In a still further aspect the invention consists in materials produced by the preceding method.

Figure 1:
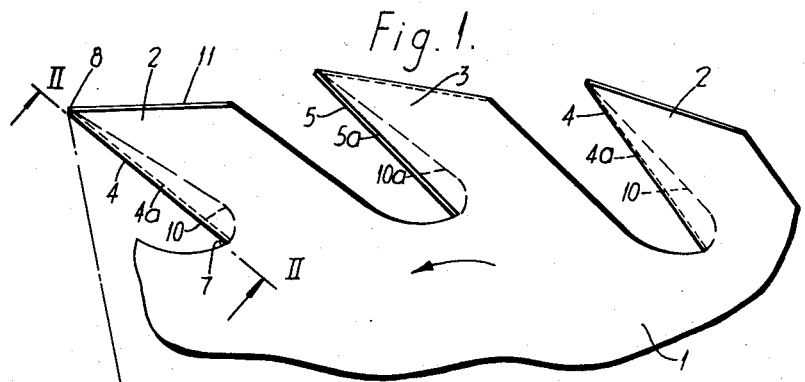
Figures 2, 3:
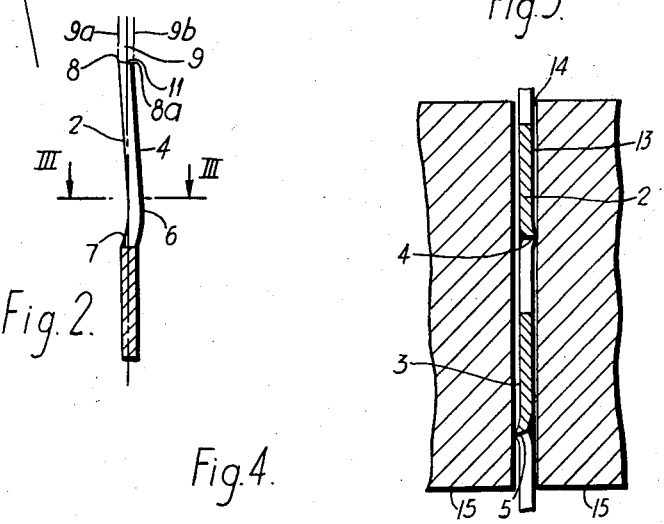
Figure 4:
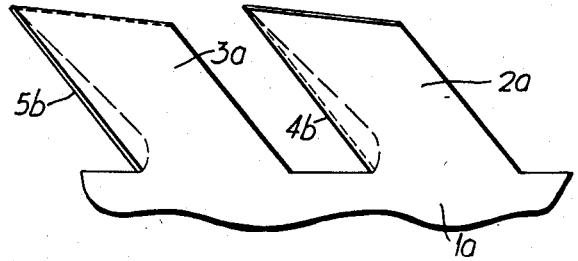

One preferred form of the invention will now be described with reference to the accompanying drawings, in which:

Figure 1 is a partly diagrammatic side elevation of part of a circular saw constructed according to the invention, Figure 2 is a part section on the line II—II, Figure 1, Figure 3 is a partly diagrammatic section through two teeth on the line III—III, Figure 2, showing the saw in use, and Figure 4 is a fragmentary side elevation of a further embodiment of the invention as applied to a straight saw, e.g. a band saw, frame saw, or deal-frame saw.

Referring to the construction shown in Figures 1 to 3 of the drawings, a circular mill saw 1 (shown in part in Figure 1) for sawing wood and having teeth of a substantially known profile, is modified according to the invention as follows:

Each tooth 2, 3, is provided with a planing edge 4, 5 which is bevelled rearwardly as at 4a, 5a, to assist the tooth in giving a slicing action as will be described.

So that the teeth in use will plane a side of a saw cut made by the saw, each planing edge 4 or 5 is offset laterally a slight distance beyond the thickness of the saw at 6 near the root 7 of the tooth, and each outermost point 8 which makes the saw cut is disposed just outside the thickness of the saw blade 1 on the opposite side of the saw to the offset at 6, as shown with reference to the plane line 9a in Figure 2, the medial plane of the blade 1 being represented by the line 9 (Figure 2). From the point 6 of maximum lateral offsetting of the planing edge 4 the planing edge extends in a substantially straight line to the point 8a opposite to the outermost point 8, the point 8a being just within the thickness of the saw, i.e. lying between the planes 9a and 9b but nearer to 9b than 9a.

The planing edges 4, 5, on alternate teeth 2, 3, are on opposite sides so as to plane both sides of the saw cut in the flitch 15.

The top 11 of the tooth is bevelled towards the planing edge as may be seen in Figure 2, and the planing edge 4 is raked rearwardly from the point 8 to the root 7 thereof at an angle of about 40° to the radial line 12 through the point 8. In addition, referring to Figure 3, the face 13 of each tooth 2 nearest the surface 14 of the flitch of wood 15 being cut and planed, is rolled adjacent to the cutting edge 4 to give clearance from the surface 14. Similar but opposite shaping is given to the teeth 3 for the same purpose.

The curved broken lines 10 and 10a in Figure 1 represent rolling of the teeth in order to form them to the shape shown in Figure 2. The roll is exaggerated in Figure 3.

The use of the invention is as follows:

On a flitch of wood being presented to the saw, the points 8 of the teeth 2 and 3 cut into the wood, thus opening up a kerf or saw cut. Since the points 8 lie just outside the thickness of the blade 1, this saw cut is only a little wider than the thickness of the blade. As the wood is pushed forwardly into the saw, substantially simultaneously with the cutting of the kerf the planing edges 4, 5, commence planing the wood by giving a series of slicing planing or smoothing cuts which are almost parallel to the plane of the saw, although because the cut edges are offset laterally for the greatest distance at 6, with the offset tapering towards the points 8a, the series of cuts will be at a slight angle to the plane of the saw.

The result of this planing action is two-fold. Firstly the wood being cut is given a finish which is much better than the finish normally given by a saw having teeth of ordinary form. Secondly the planing gives clearance for the blade so that after the parts 6 of the tooth have finished cutting there is clearance between the blade 1 and the wood being cut.

It will be understood that this clearance will be of the order of a few thousandths of an inch only, say up to 5 thousandths of an inch, and, of course, the clearance will be adjusted according to the wood being cut, as some woods require more clearance than others.

In the construction shown in Figure 4, the teeth 2a and 3a are of a similar general form to the teeth 2 and 3 shown in Figure 1, but the saw 1a is a straight saw. The cutting edges 4b and 5b may be at an angle of about 40° to perpendiculars taken from the direction of the length of the saw.

The points 8 of the saw can be positioned and shaped as desired to give an action which assists in pulling the work into the saw, and/or if desired known types of feeding mechanisms can be used to feed the work.

I have found that the saws above described are particularly efficacious in cutting hard knotty woods giving a good finish to such woods.

Advantages of the invention are as follows:

(1) When cutting seasoned timbers, the boards cut can continue on from the saws through a sanding machine, giving a good finish without the necessity for passing the boards through a planing machine.

(2) Most standard saw teeth can be readily modified to the present invention so that the cost of conversion is very small.

(3) Because of the small clearance necessary to allow the saw blade to work freely in the saw cut, a saving in material is gained in that more boards can be cut from the same flitch than was previously possible.

(4) Due to the fact that planing is not necessary, or in the event that a very high finish is desired, only a very light planing is necessary and considerable saving in material results.

The construction is of course applicable to cutting devices other than the circular saw above described and for example teeth according to the invention may be used in band saws, frame and deal frame saws.

I claim:

A saw blade comprising a succession of spaced elongated teeth extending along one edge thereof, a bevelled cutting edge formed on the outermost periphery of each of said teeth, the cutting edge of alternate teeth being on the opposite faces thereof, a bevelled planing edge formed on the leading periphery of each of said teeth on the face opposite to that of the respective cutting edge thereof, and a lateral offset formed on the face of each tooth wherein the respective planing edge is formed, said offset tapering from a maximum distance substantially at the tooth root toward the outermost periphery thereof, the maximum distance of said offset slightly exceeding the thickness of the blade, the said bevelled planing edge of each respective tooth lying in a level plane from the region of the maximum lateral offset to the outermost periphery.

References Cited in the file of this patent
UNITED STATES PATENTS

| | | |
|---|---|---|
| 29,982 | Mason | Sept. 11, 1860 |
| 31,073 | Brown | Jan. 8, 1861 |
| 74,521 | Emerson | Feb. 18, 1868 |
| 105,345 | Littlepage | July 12, 1870 |
| 312,133 | Ledward | Feb. 10, 1885 |
| 474,492 | Wilson | May 10, 1892 |
| 2,071,618 | Ferrari et al. | Feb. 23, 1937 |
| 2,725,906 | Markham | Dec. 6, 1955 |